(12) United States Patent
Engel et al.

(10) Patent No.: US 10,323,801 B2
(45) Date of Patent: Jun. 18, 2019

(54) SEMICONDUCTOR TUBULAR LAMP, TUBE THEREFOR, AND PRODUCTION METHOD

(71) Applicant: LEDVANCE GmbH, Garching (DE)

(72) Inventors: Andreas Engel, Hiltenfingen (DE); Reinhold Schmidt, Augsburg (DE); Joachim Wirth-Schoen, Guenzburg (DE)

(73) Assignee: LEDVANCE GMBH, Garching Bei München (DE)

( * ) Notice: Subject to any disclaimer, the term of this patent is extended or adjusted under 35 U.S.C. 154(b) by 0 days.

(21) Appl. No.: 15/941,711

(22) Filed: Mar. 30, 2018

(65) Prior Publication Data

US 2018/0224073 A1   Aug. 9, 2018

Related U.S. Application Data

(63) Continuation of application No. 15/118,712, filed as application No. PCT/EP2014/077916 on Dec. 16, 2014, now Pat. No. 9,958,117.

(30) Foreign Application Priority Data

Feb. 14, 2014   (DE) .................. 10 2014 202 759

(51) Int. Cl.
| | |
|---|---|
| *F21K 9/278* | (2016.01) |
| *F21V 3/06* | (2018.01) |
| *F21V 19/00* | (2006.01) |
| *F21K 9/90* | (2016.01) |
| *F21K 9/272* | (2016.01) |

(Continued)

(52) U.S. Cl.
CPC .............. *F21K 9/278* (2016.08); *F21K 9/272* (2016.08); *F21K 9/90* (2013.01); *F21V 3/061* (2018.02); *F21V 15/015* (2013.01); *F21V 19/003* (2013.01); *F21V 19/0045* (2013.01);
(Continued)

(58) Field of Classification Search
CPC . F21K 9/272; F21K 9/278; F21K 9/90; F21V 3/061; F21V 15/015; F21V 19/003; F21V 19/0045
See application file for complete search history.

(56) References Cited

U.S. PATENT DOCUMENTS

| | | | |
|---|---|---|---|
| 3,098,945 | A | 7/1963 | Lemmers |
| 3,113,010 | A | 12/1963 | Willis et al. |

(Continued)

FOREIGN PATENT DOCUMENTS

| | | | |
|---|---|---|---|
| EP | 1813857 | A1 | 8/2007 |
| JP | 62150893 | A | 7/1987 |

(Continued)

*Primary Examiner* — Laura A Gudorf
(74) *Attorney, Agent, or Firm* — Hayes Soloway PC

(57) ABSTRACT

A tube for a semiconductor tubular lamp is disclosed, which tube has at least one holding projection for holding at least one printed circuit board on the inside of the tube, wherein the tube is a glass tube, and the at least one holding projection is an inwardly bulging, reshaped burling region of the tube. A semiconductor tubular lamp has a tube and at least one printed circuit board fitted with a semiconductor light source, which is accommodated in the tube and is held transversely to a longitudinal direction of the tube by means of at least one burling region in a form-fitted manner. The invention is in particular applicable to LED retrofit lamps for fluorescent lamps, in particular for replacing conventional tube lamps or flashlights of type T5 or T8.

22 Claims, 6 Drawing Sheets

(51) Int. Cl.
   *F21V 15/015*    (2006.01)
   *F21Y 103/10*    (2016.01)
   *F21Y 115/10*    (2016.01)

(52) U.S. Cl.
   CPC ....... *F21Y 2103/10* (2016.08); *F21Y 2115/10* (2016.08); *Y02B 20/386* (2013.01)

(56) References Cited

U.S. PATENT DOCUMENTS

| | | |
|---|---|---|
| 2009/0290334 A1 | 11/2009 | Ivey et al. |
| 2010/0102730 A1 | 4/2010 | Simon et al. |
| 2010/0265693 A1 | 10/2010 | Ryu et al. |
| 2010/0321921 A1 | 12/2010 | Ivey |
| 2011/0267805 A1 | 11/2011 | Hua et al. |
| 2011/0317410 A1 | 12/2011 | Huang et al. |
| 2012/0008314 A1 | 1/2012 | Simon et al. |
| 2012/0099302 A1 | 4/2012 | Kim |
| 2013/0093359 A1 | 4/2013 | Hsu et al. |

FOREIGN PATENT DOCUMENTS

| | | |
|---|---|---|
| JP | 2005327568 A | 11/2005 |
| WO | 2012063174 A2 | 5/2012 |
| WO | 2013056516 A1 | 4/2013 |

SEMICONDUCTOR TUBULAR LAMP, TUBE THEREFOR, AND PRODUCTION METHOD

CROSS-REFERENCE TO RELATED APPLICATIONS

This application is a continuation of U.S. patent application Ser. No. 15/118,712, filed on Aug. 12, 2016, which is the U.S. national phase entry under 35 U.S.C. § 371 of International Application No. PCT/EP2014/077916, filed on Dec. 16, 2014, which claims priority to German Patent Application No. 10 2014 202 759.4, filed on Feb. 14, 2014. Each of these patent applications is incorporated by reference herein in its entirety.

FIELD OF THE DISCLOSURE

The invention relates to a tube for a semiconductor tubular lamp, wherein the tube has at least one holding projection for holding a printed circuit board on the inside of the tube. The invention further relates to a semiconductor tubular lamp with such a tube as well as a fitted printed circuit board, which is accommodated in the tube and held transversely to the longitudinal direction of the tube in a form-fitted manner. The invention also relates to a method for producing such a tube. The invention is in particular applicable to LED retrofit lamps for fluorescent lamps, in particular for replacing conventional tubular lamps or flash lights of type T5 or T8.

BACKGROUND

EP 1 813 857 A1 discloses a light source. The light source comprises a linear arrangement of encased LEDs as well as a rod-shaped body made of optically transparent material. This body has an external surface with a portion with convex cross section and a recess extending along the rod-shaped body, wherein the linear arrangement is located, so that the rod-shaped body at least partially surrounds each housing. Light emitted by the encased LEDs propagates in optically transparent material, in which the convex portion of the surface acts as a cylindrical lens. The external shell can surround the rod-shaped body and the light generating elements protectively and possibly also in stabilizing manner.

WO 2012/063174 A2 discloses a lighting device comprising an elongated and translucent tube equipped with a light diffuser, electrical contacts disposed at the ends of the tube and an elongated solid-state light element extending along the tube and connected with the electrical contacts. The solid-state light element is attached to an external surface of the tube and emits light through the tube.

WO 2013/056516 A1 discloses a lighting device comprising a light source with a main emission direction forward and a shell, in which the light source is arranged. The shell has a light-diffusing upper portion to reflect a part of the light of the light source laterally and backwards relative to the main emission direction and to let another part pass. The distribution of light intensity of the lighting device is more homogeneous as the backwards directed and the lateral light intensity are enhanced.

US 2009/0290334 A1 discloses a LED retrofit light source constructed such that an entirety of a radially external portion of a tubular housing is at least partially defined by a high-grade dielectric translucent material. The forming of such a portion prevents that an operating person suffers from an impulse or electric shock due to a capacitive coupling when an end of the LED retrofit light source is installed. A printed circuit board is in heat-conducting connection with the tubular housing so that a dissipation of heat from the LEDs of a side of the printed circuit board opposite to the LEDs to the environment is achieved.

US 2010/0265693 A1 discloses a LED lighting device, which can be used as an interior lighting or a display lighting. The LED lighting device comprises a tube-like optical housing with a light-emitting surface and a LED arrangement in the optical housing. The light emission surface has a valley line, a first internal fin and a second internal fin which are disposed at opposite sides of the valley line. The LED arrangement includes a plurality of LEDs, of which the center points are arranged along the valley line.

US 2010/0321921 A1 discloses embodiments of retrofit or replacement lamps for conventional fluorescent tubes for use in a conventional fluorescent lamp. An embodiment comprises a tubular housing, a printed circuit board arranged within the housing, a pair of end caps at opposite ends of the tubular housing with at least one pin contact and an arrangement of LEDs, which are arranged in longitudinal direction along the printed circuit board, wherein a number and a distance of the LEDs uniformly and completely occupy a space between the end caps, wherein at least one pin contact is in electrical contact with the LEDs and wherein a wavelength conversion material is present at at least one portion of the tubular housing.

US 2011/0267805 A1 discloses a hollow, liquid-cooled and strip-shaped LED lamp comprising a LED driver, a LED light source, a LED substrate, a light distribution screen, electrical connections at both ends and a lamp socket. A hollow internal container is set in the light distribution screen. The cavity between the hollow internal container and the light distribution screen is filled with a heat conducting liquid. The LED substrate is immersed in the heat conducting liquid. The LED lamp dissipates the heat by means of the liquid, which achieves a good heat emission. Furthermore, the internal container and the light distribution screen form a hollow shell which is filled with high-grade heat conducting liquid, and the hollow shell can be made of light-weight materials.

US 2011/0317410 A1 discloses a LED lighting device comprising a substrate, a shell facing the substrate and at least one LED arranged on the substrate. The substrate has a first surface. The first surface comprises an installed surface and a convex surface connected with the installed surface. The shell includes a light emission portion facing the first surface of the substrate. The at least one LED is arranged on the installed surface of the substrate. A part of the light emitted by the at least one LED is reflected by the convex surface of the first surface of the substrate and passes through the shell to the outside.

US 2012/0099302 A1 discloses a LED lamp, comprising: a LED module with at least one LED printed circuit board and a plurality of LEDs arranged on the LED printed circuit board, a cover covering the LED module and a pair of bases which are respectively connected with one end of the cover. The respective base comprises: a cap attached to an end of the cover, a pin portion for applying electricity to the LED module, a fastening portion surrounding a bottom end of the pin portion to fasten it, and a protection formed so as to be higher than an end of the pin portion and enclosing the pin portion along a circumferential direction.

US 2013/0093359 A1 discloses a lighting device comprising a tube, an insulating body, a first circuit substrate and a plurality of first light-emitting diodes. At least a part of the tube is translucent. The insulating body is disposed within the tube and comprises a first surface and a second surface opposite to the first surface. The first circuit substrate is arranged on the first surface. The first light-emitting diodes are electrically connected with the first circuit substrate.

SUMMARY

The object of the present invention is to overcome the disadvantages of prior art at least partially and in particular to provide an especially easy to assemble, strong, inexpensive and/or durable semiconductor tubular lamp.

This object is achieved according to the features of the independent claims. Preferred embodiments can in particular be learned of the dependent claims.

The object is achieved by a tube for a semiconductor tubular lamp which tube has at least one holding projection for holding a printed circuit board on the inside of the tube, wherein the tube is a glass tube and the at least one holding projection is an inwardly (i.e. into the interior of the glass tube) bulging reshaped region (in the following designated as "burling region" or "burling" without limitation of generality). The burling region may also be designated as "depression region" or "crown".

The at least one burling region therefore serves for holding, fastening or fixing the at least one printed circuit board. Due to the fact that the tube is a glass tube in contrast to a plastic tube there is the advantage that it can comparatively easily be reshaped for producing the at least one burling region without being damaged. Thus, manufacturing costs can be reduced. Particularly, the tube can be reshaped out of a simple, inside smooth glass tube. A complex production of interior holding structures by means of material added to a base form of the tube can be skipped.

Compared to a plastic tube, a higher stability of the glass tube against mechanical stresses, e.g. against a deflection, especially with great lengths, follows. Furthermore, a glass tube is more scratch-proof than a plastic tube. Moreover, a glass tube has a substantially better UV stability.

The glass tube may have one or more burling regions. These may be distributed in circumferential direction and/or in longitudinal direction of the tube. The glass tube may also be designated as a tubular glass bulb. The glass tube is translucent at least in certain areas, in particular completely.

The printed circuit board has at least one semiconductor light source. Preferably, the at least one semiconductor light source comprises at least one light-emitting diode. In case of a number of light-emitting diodes being present, these may light in the same colour or in different colours. A colour can be monochrome (e.g. red, green, blue etc.) or polychrome (e.g. white). Also, the light emitted by the at least one light-emitting diode can be an infrared light (IR LED) or an ultraviolet light (UV-LED). A number of light-emitting diodes can produce a multicoloured (sum) mixed light; e.g. a white mixed light. The at least one light-emitting diode can contain at least one wavelength converting phosphor (conversion LED). Alternatively, or additionally, the phosphor can be disposed remote from the light-emitting diode ("remote phosphor"). At least one light-emitting diode can be present in form of at least one individually encased light-emitting diode or in form of at least one LED chip. A number of LED chips can be mounted on a common substrate ("submount"). The at least one light-emitting diode can be fitted with at least one own and/or common optics for beam guiding, e.g. at least one Fresnel lens, a collimator and so on. Instead of or additionally to inorganic light-emitting diodes, e.g. based on InGaN or AlInGaP, organic LEDs (OLEDs, e.g. polymer OLEDs) can also be used in general. Alternatively, the at least one semiconductor light source can for example comprise at least one diode laser.

The printed circuit board may additionally comprise at least one electrical and/or electronical member for operating the at least one semiconductor light source (driver member). Then, the printed circuit board can also be designated as a "light engine", without the driver member also as a module.

The printed circuit board may also be designated as a "lighting band", in cases where the at least one semiconductor light source is a LED, also as a "LED band". Such LED bands are available from the company Osram under the tradename "LINEARlight" for example.

The glass tube may be transparent or opaque or light-diffusing, e.g. made of frosted glass and/or have a light-diffusing surface. The glass tube may be coated completely or in an area, e.g. partially with an opaque layer, an anti-reflective layer, a light-diffusing layer, a hard layer etc., in particular on the inside of the tube. The glass tube advantageously has an enhanced stability and/or better adhesion of the coating(s) compared to a plastic tube.

In particular, at least one burling region is a locally limited region, of which sidewise or lateral extension in at least one direction (e.g. in a longitudinal direction and/or in a circumferential direction of the tube) is smaller than an extension of the non-reshaped glass tube in this direction by at least one order of magnitude. Therefore, a burling region locally limited only in a circumferential direction of the tube may have a not negligibly small extension in longitudinal direction compared to a tube length, e.g. extend over the total or almost the total length of the tube.

In particular, at least one burling region is a "point-shaped" region which is smaller than the non-reshaped glass tube both in the longitudinal direction and in the circumferential direction by at least one order of magnitude (i.e. about a factor 10). For example, the burling region can be formed in rounded, oval or elliptical shape.

In a configuration the tube has at least two burling regions. These can particularly be provided or formed and arranged in a mirror-symmetrical manner to each other, in particular to an imaginary plane intersecting the tube longitudinally ("longitudinal plane"). Thus, a holding or guidance of the printed circuit board in the glass tube transversely to its longitudinal direction is allowed in an especially simple way. In particular, a band-shaped printed circuit board can easily be inserted into the glass tube in longitudinal direction and held there in transverse direction by means of the burling regions.

It may be sufficient when a burling region is located on each side of the longitudinal plane, in particular a burling region extending in longitudinal direction. The printed circuit board may also be held at the end or front side by the end caps.

In another configuration the tube has at least two groups of burling regions which groups are arranged at respective sections of the tube spaced longitudinally. In particular, no burling regions are present between these sections. This configuration simplifies an economic production of the burling regions. Particularly. the burling regions of a section are located at a same length position. The sections can also be considered as ring-shaped length portions of the tube.

The number of sections provided with burling regions can be different and, for example, also amount to more than two. Thus, three, four or even more sections can be present for example when the tube has a great tube length and/or a high stability or stiffness of the printed circuit board is desired. For example, a printed circuit board in a tube with a tube length of about 600 mm may be fixed by means of two sections, in a tube with a tube length of about 1200 mm fixed by means of four sections etc.

In still another configuration the sections of the tube comprise identical burling regions, thus of the same shape. This facilitates the introduction of the burling regions even more as the tool required therefore doesn't need to be changed.

In a further configuration the burling regions are provided (or formed and arranged) so that they contact exactly one flat side of the printed circuit board (i.e. an upper surface or a lower surface), and the other flat side rests on a non-reshaped region of the tube. Hereby a holding of the printed circuit board with especially few crowns can be achieved. This configuration is usable with particular benefit when an inner side of the tube is not susceptible to scratches and will therefore not be damaged by a printed circuit board inserted by a rubbing and sliding movement on the inner side.

Additionally, in a configuration the burling regions are provided so that they contact both flat sides of the printed circuit board, thus both the upper side and the lower side. This avoids that the printed circuit board slides or scratches over the inner side of the tube during an insertion and thus damages the coating susceptible to scratches. In fact, the printed circuit board will now be held only by the burling regions which are particularly formed only in a point-shaped manner.

Contacting a flat side also comprises contacting a longitudinal angle or longitudinal edge related to this flat side, in particular only the longitudinal edge.

Furthermore, in a configuration an edge-to-edge distance of adjacent burling regions corresponds to at least twice a wall thickness of the non-reshaped tube. Thus, a disadvantageously large reduction of wall thickness of the tube can be avoided.

The object is also achieved by a semiconductor tubular lamp comprising at least one tube as described above. This semiconductor tubular lamp can be configured analogue to the tube and yields the same advantages.

In a configuration the semiconductor tubular lamp comprises at least one printed circuit board fitted with at least one semiconductor light source which is accommodated in the tube and held transversely to a longitudinal direction of the tube by at least one burling region at least in a form-fitted manner (when appropriate, also in a force-fitting and/or form-fitting manner). In particular, a form-fitted holding may be considered as a holding where the tube and the printed circuit board interlock so that they cannot separate from each other even without or with interrupted force transmission. In other words, with the form-fitted holding the tube blocks the printed circuit board and thus prevents a free movement of the printed circuit board. In particular, a force-fitted holding may be considered as a holding where the printed circuit board is held by means of the tube by adhesive friction.

In a further configuration the semiconductor tubular lamp comprises a double T support on whose opposite flat sides at least one printed circuit board rests respectively, and the support is guided by the regions inwardly bulging between the flat sides towards a center part of the support.

In a further configuration the printed circuit board is held by the burling regions slideably in a longitudinal direction. Therefore, the printed circuit board can still freely move in longitudinal direction in relation to the tube. Furthermore, if there is a longitudinal clearance by the end caps the printed circuit board can freely move over a short distance even in the completely assembled semiconductor tubular lamp. This results in the advantage that the printed circuit board can freely move in case of a longitudinal expansion (e.g. due to a heating) and does not bend.

Alternatively, the printed circuit board may not or virtually not be slideable in longitudinal direction in relation to the tube. This may be achieved for example by a force fitting and/or firmly bonded holding in the tube and/or by fixing in longitudinal direction by means of end caps of the semiconductor tubular lamp. A firmly bonded holding may particularly be understood as a holding where the tube and the printed circuit board are held together by atomic or molecular forces, e.g. by means of adhesion. In particular, it is a holding which can be separated only by destruction of the connecting means.

In another embodiment the semiconductor tubular lamp is a retrofit lamp, particularly for replacing a conventional fluorescent lamp, in particular of type T5 or T8, or a conventional linear lamp.

The object is further achieved by a method for producing a tube or a tubular bulb, in particular as described above, wherein the tube is provided, then locally heated and inwardly pressed at the at least one locally heated point for producing the at least one burling region. Thereby the same advantages are achieved as with the devices described above, and the procedure can be configured in an analogue manner.

The local heating and inward pressing can simultaneously be performed for several burling regions (e.g. for several burling regions of one same section). Alternatively, or additionally, the local heating and inward pressing can successively be performed for several burling regions (e.g. for different sections).

For example, the local heating can be performed by means of a burner directed towards the point to be heated. In order to avoid internal tensions, the at least one point to be heated may first be pre-heated by means of a burner (particularly by means of at least one dedicated pre-heating burner) and then be heated up to the desired end temperature (particularly by means of at least one dedicated heating burner).

In another configuration the at least one point locally heated can be inwardly pressed by means of truncated conical, semicircular or sickle-shaped (mold) tool. This tool shape enables to form a deep, precisely reproducible burling region with sufficient wall thickness.

The truncated conical tool preferably comprises a diameter of 1 mm to 3 mm, particularly of about 2 mm. A cone angle preferably amounts to about 10°-15°. It turned out to be advantageous to press the burling region by 2 mm to 6 mm, particularly about 4 mm, inwardly. The thicker the wall thickness of the tube is, the deeper it can be pressed inwardly to achieve a sufficient deformation.

An embodiment advantageous for avoiding tensions at or in the burling region is to heat or anneal the burling region again, for example by means of at least one dedicated annealing burner. The annealing burner may correspond to the pre-heating burner and heat a total section, for example.

The distance of the next burling region to a front of the tube for example ranges between about 200 mm and 250 mm.

BRIEF DESCRIPTION OF THE DRAWINGS

The qualities, features and advantages of this invention described above as well as the way how to achieve these become more clear and significant comprehensible in connection with the following schematic description of embodiments explained in more detail in connection with the drawings. Thereby the same or evenly effective elements can be provided with identical reference numerals for sake of clarity.

DETAILED DESCRIPTION

Figure 1:
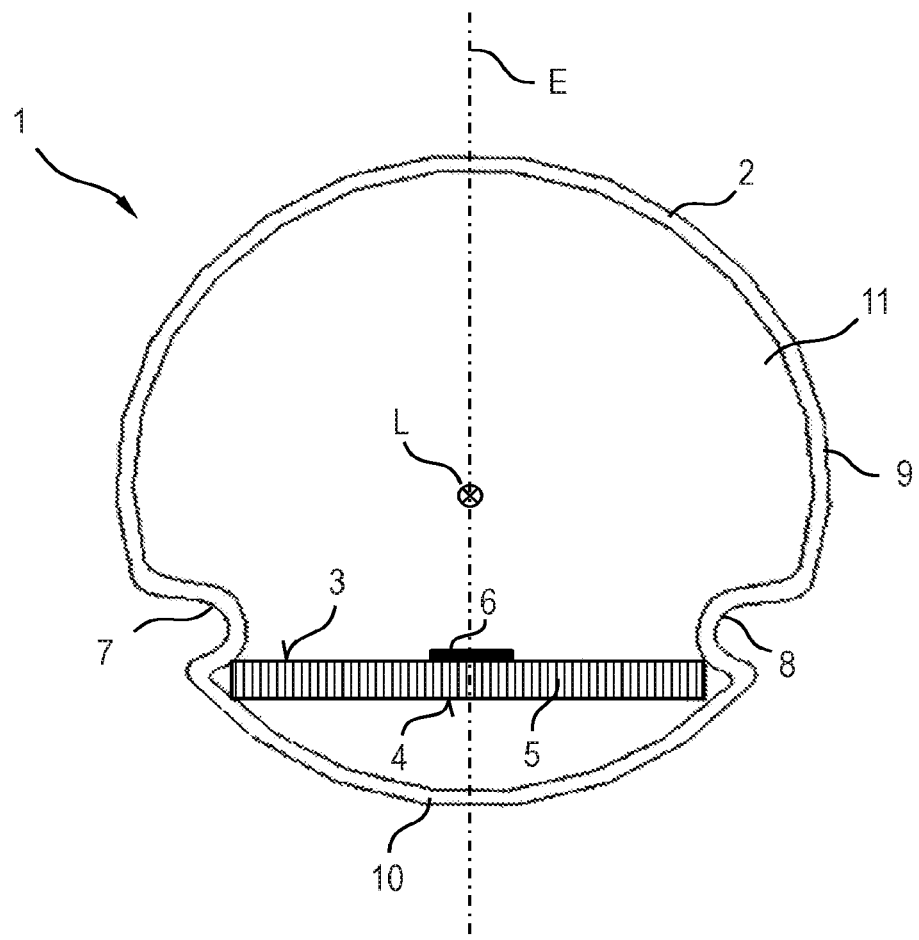
FIGS. 1 to 5 show first to fifth embodiments of tubes of respective semiconductor tubular lamps in cross-sectional front view.

FIG. 1 shows a first embodiment of a translucent glass tube 2 of a semiconductor tubular lamp in form of a LED retrofit lamp 1 for replacing e.g. a fluorescent lamp ("flash light") of type T5 or T8.

The glass tube 2 has a basically circular ring-shaped cross section with e.g. two open front surfaces. The glass tube may be transparent or translucent (frosted). The glass tube 2 may be coated completely or in an area, e.g. in part with an opaque coating or layer, an anti-reflective layer, a diffusing layer, a hard layer and so on.

Here a printed circuit board 5 is inserted into an interior space 11 of the glass tube 2 and is held by the glass tube 2. A front side 3 of the printed circuit board 5 is fitted with a number of semiconductor light sources in form of LEDs 6 (in particular LED chips) which are arranged in line spaced to each other along a longitudinal axis L of the glass tube 2. Here a rear side 4 of the printed circuit board 5 is not fitted, but may also be fitted, e.g. with electrical and/or electronical members and/or with LEDs 6.

For supporting or holding the printed circuit board 5 the glass tube 2 comprises at least two, inwardly bulged projecting burling regions 7, 8, of which exactly two burling regions 7, 8 are shown here. The burling regions 7, 8 are disposed for example in mirror symmetry relative to a longitudinal plane E intersecting the glass tube 2 longitudinally. The longitudinal plane E extends perpendicular to the longitudinal axis L. In the depicted sectional plane, the glass tube 2 further has a first circle segment shaped portion 9 joining above and a second circle segment shaped portion 10 joining below.

The burling regions 7, 8 can extend continuously along the longitudinal axis L. But several burling regions 7 and 8, respectively, arranged in line spaced along the longitudinal axis L can also be used, preferably at least two burling regions 7 and at least two burling regions 8. These burling regions 7 and 8, respectively, can be configured in e.g. locally limited or "point-like" shape. The burling regions 7 and 8 together with the second (lower) circle segment shaped portion 10 guide the printed circuit board 5 between them and fix and position it.

Therefore, together with the second circle segment shaped portion 10 the burling regions 7 and 8, respectively, serve for attaching and positioning the printed circuit board 5 at least transversely to the longitudinal axis L. The burling regions 7 and 8, respectively, hold the printed circuit board 5 at its upper surface 3, in particular at a respective (upper) longitudinal edge of the printed circuit board 5. The second circle segment shaped portion 10 holds the printed circuit board at its lower surface 4, in particular at its longitudinal edges.

This embodiment is usable in an especially advantageous manner, if an inner side of the glass tube 2 is not susceptible to scratches and will thus not be damaged there by a movement and/or support of the printed circuit board 5 on the second circle segment shaped portion 10.

The burling regions 7, 8 have been produced by subsequent reshaping of the glass tube 2 first provided without the burling regions 7, 8, e.g. by local pressing inwardly.

Figure 6:
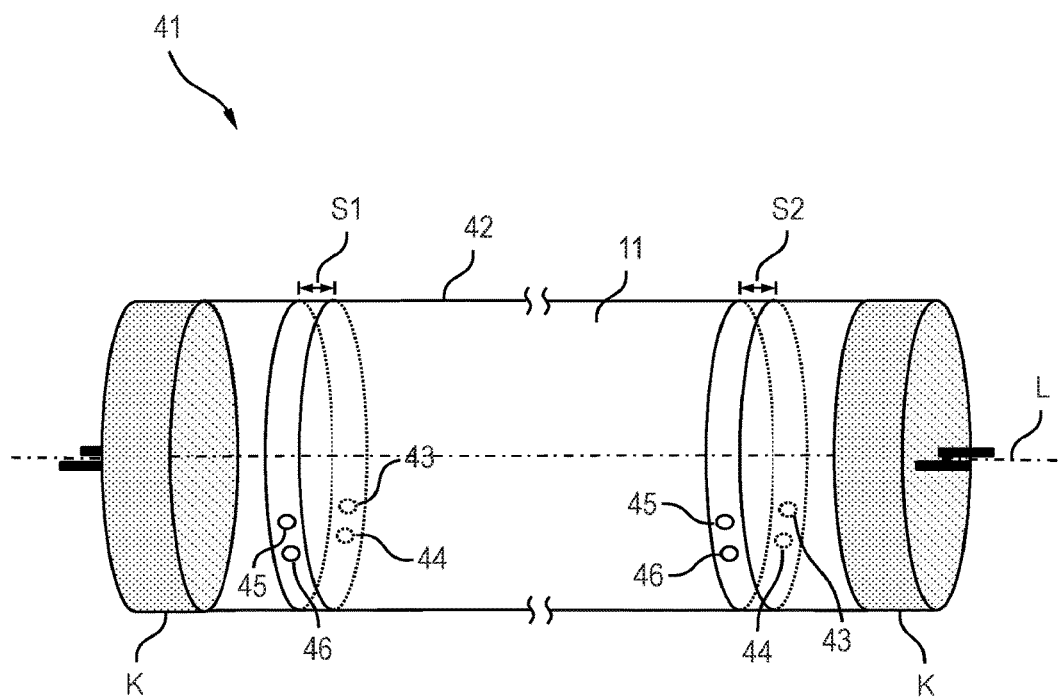
FIG. 6 shows a semiconductor tubular lamp with a tube according to the fourth embodiment in an oblique side view.

Besides the glass tube 2 and the fitted printed circuit board 5, for example, the LED retrofit lamp 1 may yet have end caps attached on the face as shown in FIG. 6, by way of example.

Figure 2:
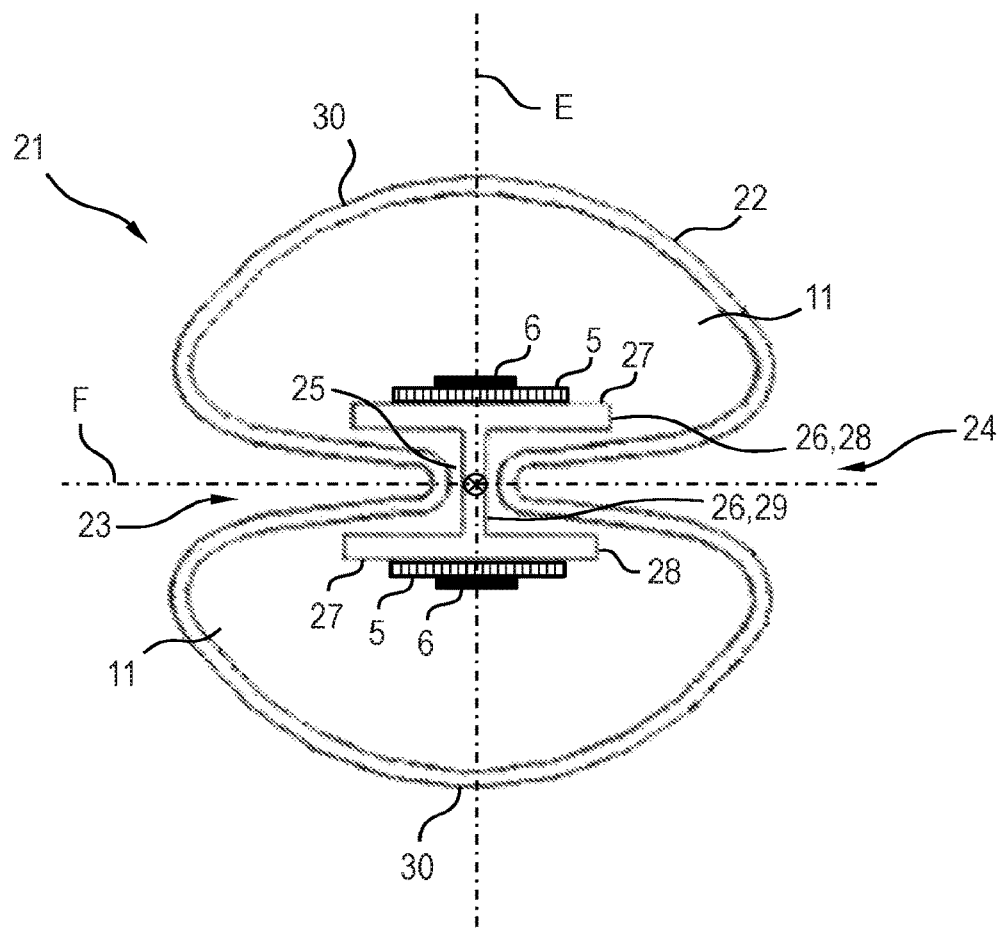

FIG. 2 shows a second embodiment of a glass tube 22 of a semiconductor tubular lamp in form of a LED retrofit lamp 21. The LED retrofit lamp 21 also comprises at least two inwardly bulged projecting burling regions 23, 24 which centrally constrict the glass tube 22 in profile. Therefore, the glass tube 22 is formed in mirror symmetry not only relative to the perpendicular plane E, but also relative to a horizontal plane F.

The burling regions 23, 24 are bulged inwardly so far that they leave only a comparatively narrow gap 25 between them. A double T shaped support 26, e.g. made of aluminum, is inserted into the gap 25. One printed circuit board 5 each is attached to the opposite external flat surfaces 27 of the transverse parts 28 (also designated as flanges). Hence, the LED retrofit lamp 21 comprises LEDs 6 not only radiating into a half space, but emits light into two half spaces, namely into an upper half space and into a lower half space, as shown here. A central part 29 or web is passed through the gap 25 for fastening and positioning the support 26 and therefore the printed circuit boards 5.

Circle segment shaped portions 30 of the glass tube 22 join to the burling regions 23, 24 at the upper side and the lower side.

Figure 3:
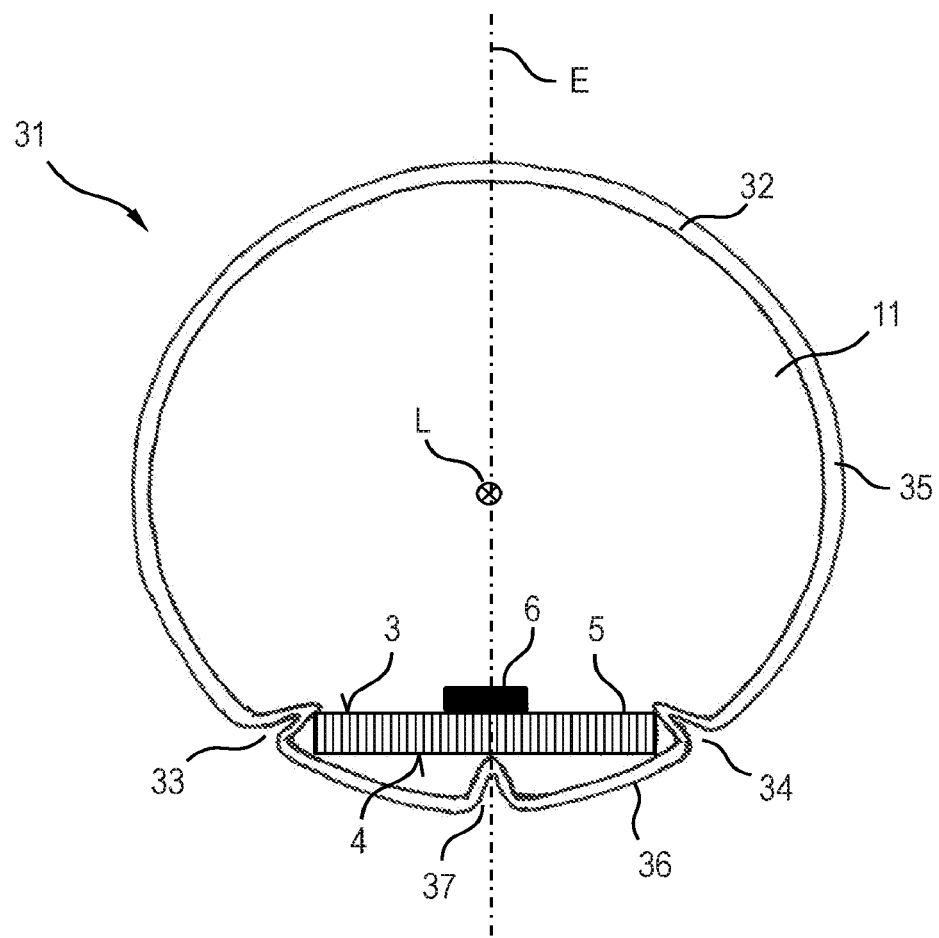

FIG. 3 shows a third embodiment of a glass tube 32 of a semiconductor tubular lamp in form of a LED retrofit lamp 31.

Similar to the LED retrofit lamp 1, the glass tube 32 comprises at least two inwardly bulged projecting burling regions 33, 34 which rest on the upper surface 3 of the printed circuit board 5, in particular in the area of a longitudinal edge. The burling regions 33, 34 thus serve as an abutment or holding against a movement of the printed circuit board 5 towards its upper surface 3. By way of example, the burling regions 33, 34 are here located in mirror symmetry relative to the perpendicular plane E intersecting the glass tube 32 longitudinally. Similar to the LED retrofit lamp 1, the glass tube 32 further comprises a first circle segment shaped portion 35 joining above to the burling regions 33, 34 and a second circle segment shaped portion 36 joining below them.

In addition to the LED retrofit lamp 1, the second circle segment shaped portion 36 comprises at least one further burling region 37 in the center and therefore in the region of the perpendicular plane E. This burling region 37 contacts the lower surface 4 of the printed circuit board 5 centrally. For example, the burling region 37 may serve to provide greater support to the printed circuit board 5 from below, e.g. for a force-fitting holding of the printed circuit board 5 in order to reduce a supporting force of the printed circuit board on the not crowned region of the second circle segment shaped portion 36 and/or for preventing a sagging of the printed circuit board 5 (in particular if the printed circuit board 5 is flexible). The at least one burling region 37 may be disposed at an identical longitudinal portion or section (see also FIG. 6) as the burling regions 33, 34 and/or may be disposed at other sections.

Therefore, together with the lower burling region 37 the upper burling regions 33 and 34 guide the printed circuit board 5 between them and fix and position it. Thus, the burling regions 33, 34 and 37 serve for fixing and positioning the printed circuit board 5 in the interior space 11 of the glass tube 32. Preferably, the burling regions 33, 34 and 37 are point-shaped.

Figure 4:
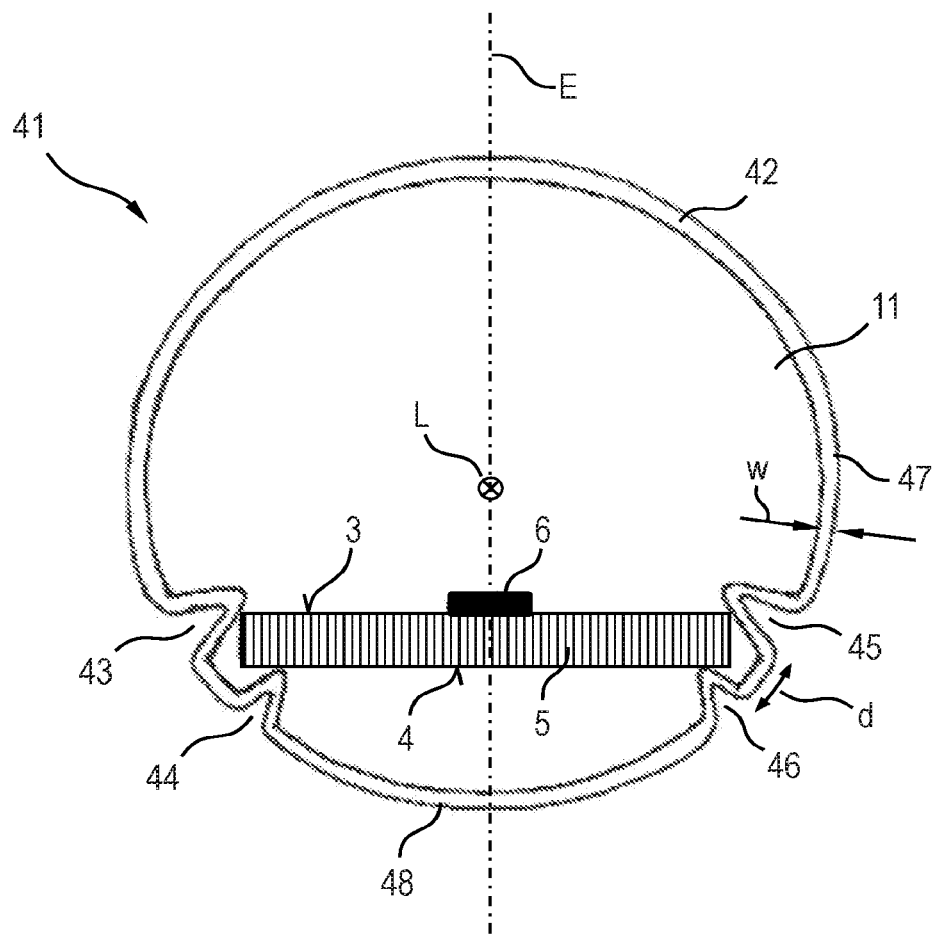

FIG. 4 depicts a fourth embodiment of a glass tube 42 of a semiconductor tubular lamp in form of a LED retrofit lamp 41.

Also, in this case, the printed circuit board 5 has been inserted into the interior space 11 of the glass tube 42. The glass tube 42 has at least two pairs of inwardly bulged projecting burling regions 43, 44 and 45, 46, respectively, for holding the printed circuit board 5. The burling regions of a pair 43, 44 and 45, 46, respectively, are spaced in circumferential direction about the longitudinal axis. Preferably, the burling regions 43 to 46 are formed in a point-shaped manner.

A distance d from edge to edge of adjacent burling regions 43 and 44 or 45 and 46 corresponds to at least twice a wall thickness w of the non-reshaped glass tube 42. Thereby, a disadvantageously great reduction of wall thickness w of the glass tube 42 can be avoided, and a precise formation of the burling regions 43 and 46 can be ensured.

The pairs 43, 44 and 45, 46, respectively, are here formed in mirror symmetry relative to a longitudinal plane E as an example. In the depicted sectional plane, the glass tube 42 has a first circle segment shaped portion 47 joining above and a second circle segment shaped portion 48 joining below.

The upper burling regions 43 and 45 of the pairs 43, 44 and 45, 46, respectively, contact the upper surface 3 of the printed circuit board, in particular in the area of or at its longitudinal edge. The lower burling regions 44 and 46 of the pairs 43, 44 and 45, 46, respectively, contact the lower surface 4 of the printed circuit board 5. The burling regions 43 to 46 therefore hold the printed circuit board 5 between them so that it does not rest on a non-reshaped region of the glass tube 42. Particularly, only the burling regions 43, 44 and 45, 46, respectively, therefore serve for fixing and positioning the printed circuit board 5 in the glass tube 42, namely at least transversely to the longitudinal axis L.

This embodiment is usable with particular advantage when an inner side of the glass tube 2 is susceptible to scratches and thus would be damaged by a movement and/or support of the printed circuit board 5 on the second circle segment shaped portion 48, e.g. by abrasion of at least one coating existing there.

Figure 5:
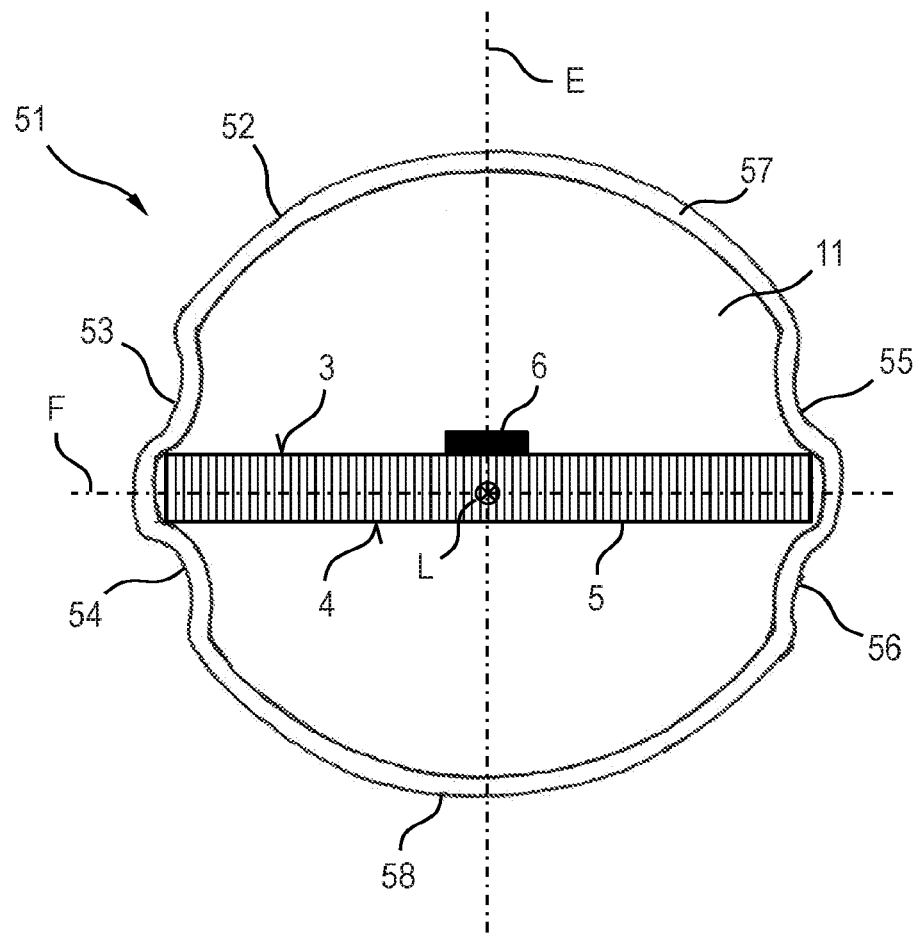

FIG. 5 shows a fifth embodiment of a glass tube 52 of a semiconductor tubular lamp in form of a LED retrofit lamp 51 with a printed circuit board 5 inserted into the glass tube 52.

For this purpose, the glass tube 52 has at least two pairs of inwardly bulged projecting burling regions 53, 54 and 55, 56, respectively. The burling regions of a pair 53, 54 and 55, 56, respectively, are spaced in circumferential direction about the longitudinal axis.

The pairs 53, 54 and 55, 56, respectively, are here formed, as an example, in mirror symmetry relative to the longitudinal plane E as well as relative to the horizontal axis F intersecting the glass tube 52 longitudinally. Thereby, the printed circuit board 5 is held in the interior space 11 at central height position. In the depicted sectional plane, the glass tube 52 further comprises a first circle segment shaped portion 57 joining above and a second circle segment shaped portion 58 joining below.

Together with the lower burling region 54 and 56, respectively, the upper burling regions 53 and 55 of the pairs 53, 54 and 55, 56, respectively, guide the printed circuit board 5 between them and fix and position it.

FIG. 6 shows the LED retrofit lamp 41, only selected as an example, with the glass tube 42 according to the fourth embodiment in an oblique side view. The glass tube 42 may have a glass tube length of about 600 mm along its longitudinal axis L, for example. At its end regions on the face the translucent glass tube 42 is covered by respective end caps K, e.g. of type G5 or G13. The glass tube 42 may have a beading there. The printed circuit board 5 is disposed within the interior space 11 of the glass tube 42, but not depicted.

The glass tube 42 comprises two sections S1 and S2 spaced along the longitudinal axis L with identical burling regions 43 to 46. The sections S1 and S2 are spaced by about 200 mm to 250 mm from the end faces of the glass tube 42. By means of the burling regions 43 to 46 of S1 and S2 the printed circuit board 5 is at least fixed transversely to the longitudinal direction L, as also depicted in FIG. 4. For compensating a thermal expansion, it may be freely moveable over a short distance in direction of the longitudinal axis L.

In FIG. 6 a glass tube 2, 22, 32 or 52 may be used analogously.

Although the invention has been illustrated and described in detail by the shown embodiments, the invention is not limited thereupon, and other variations can be derived by those ordinary skilled in the art without leaving the scope of the invention.

Thus, besides the LEDs the printed circuit board may generally comprise a driver or parts of a driver for operating the LEDs.

Generally, "a", "an" and so on can be considered as singular or plural, especially in terms of "at least a" or "one or more" and so on, as long as this is not excluded explicitly, e.g. by the term "exactly one" and so on.

Also, a numerical form can exactly include the given number as well as a usual range of tolerance, as long as this is not explicitly excluded.

REFERENCE NUMERALS

1 LED retrofit lamp
2 glass tube
3 front side of the printed circuit board
4 back side of the printed circuit board
5 printed circuit board
6 LED
7 burling region
8 burling region
9 first circle segment shaped portion of the glass tube
10 second circle segment shaped portion of the glass tube
11 interior space of the glass tube
21 LED retrofit lamp
22 glass tube
23 burling region
24 burling region
25 gap
26 support
27 exterior flat side
28 transverse part of the support
29 central part of the support
30 circle segment shaped portion of the glass tube
31 LED retrofit lamp
32 glass tube
33 burling region
34 burling region
35 first circle segment shaped portion of the glass tube
36 second circle segment shaped portion of the glass tube
37 burling region 41 LED retrofit lamp
42 glass tube
43 burling region of a first pair
44 burling region of a first pair
45 burling region of a second pair
46 burling region of a second pair
47 first circle segment shaped portion of the glass tube
48 second circle segment shaped portion of the glass tube
51 LED retrofit lamp
52 glass tube
53 burling region of a first pair
54 burling region of a first pair
55 burling region of a second pair
56 burling region of a second pair
57 first circle segment shaped portion of the glass tube
58 second circle segment shaped portion of the glass tube
d edge-to-edge distance
E perpendicular plane
F horizontal plane
K end cap
L longitudinal axis
S1 first section
S2 second section
w wall thickness

What is claimed is:

1. A glass tube for a tubular semiconductor lamp, the glass tube comprising:
a first burling region formed along a first length of the glass tube and projecting inward into an interior space of the glass tube; and
a second burling region formed along a second length of the glass tube, opposite the first burling region, and projecting inward into the interior space of the glass tube;
wherein:
the first burling region and the second burling region are configured to position a substrate of a light engine of the tubular semiconductor lamp at least transversely to a longitudinal axis of the glass tube;
the first burling region and the second burling region are configured to hold the substrate at a first surface thereof at a first longitudinal edge and a second longitudinal edge, respectively, of the substrate; and
a curved sidewall portion of the glass tube located between the first burling region and the second burling region, along a circumference of the glass tube, is configured to hold the substrate at a second surface thereof at both a third longitudinal edge and a fourth longitudinal edge of the substrate, the second surface of the substrate located opposite the first surface of the substrate.

2. The glass tube of claim 1, wherein:
the first burling region is configured to be in point contact with only the first longitudinal edge of the substrate; and
the second burling region is configured to be in point contact with only the second longitudinal edge of the substrate.

3. The glass tube of claim 2, wherein the curved sidewall portion of the glass tube is configured to be in point contact with only the third longitudinal edge and the fourth longitudinal edge of the substrate.

4. The glass tube of claim 1, wherein the first burling region and the second burling region are in mirror symmetry relative to a plane intersecting the glass tube longitudinally.

5. The glass tube of claim 1, wherein a sidewall thickness of the glass tube at each of the first burling region and the second burling region is substantially the same as a sidewall thickness of the glass tube elsewhere.

6. The glass tube of claim 1, wherein at least one of the first length and the second length constitutes an entire length of the glass tube.

7. The glass tube of claim 1, wherein at least one of the first length and the second length constitutes only a partial length of the glass tube.

8. The glass tube of claim 1, wherein at least one of the first burling region and the second burling region is rounded in cross-sectional geometry, having a radius of curvature.

9. The glass tube of claim 1, wherein at least one of the first burling region and the second burling region is pointed in cross-sectional geometry, having a vertex.

10. The glass tube of claim 1, further comprising a third burling region formed along a third length of the glass tube and projecting inward into the interior space of the glass tube, wherein the third burling region is configured to hold the substrate at the second surface of the substrate located opposite the first surface of the substrate.

11. The glass tube of claim 10, wherein the third burling region is located between the first burling region and the second burling region along the circumference of the glass tube.

12. The glass tube of claim 10, wherein the third burling region is configured to hold the substrate at the second surface of the substrate centrally.

13. The glass tube of claim 10, wherein the third length constitutes an entire length of the glass tube.

14. The glass tube of claim 10, wherein the third length constitutes only a partial length of the glass tube.

15. The glass tube of claim 10, wherein a sidewall thickness of the glass tube at the third burling region is substantially the same as a sidewall thickness of the glass tube elsewhere.

16. The glass tube of claim 10, wherein the third burling region is pointed in cross-sectional geometry, having a vertex.

17. A glass tube for a tubular semiconductor lamp, the glass tube comprising:
a first burling region formed along a first length of the glass tube and projecting inward into an interior space of the glass tube; and
a second burling region formed along a second length of the glass tube, opposite the first burling region, and projecting inward into the interior space of the glass tube;
wherein:
the first burling region and the second burling region are configured to position a substrate of a light engine of the tubular semiconductor lamp at least transversely to a longitudinal axis of the glass tube; and
the first burling region and the second burling region centrally constrict the glass tube in profile such that a narrow gap exists within the interior space of the glass tube between the first burling region and the second burling region.

18. The glass tube of claim 17, wherein the glass tube is formed in mirror symmetry about both a horizontal plane and a perpendicular plane.

19. The glass tube of claim 17, wherein the glass tube is configured to have disposed within the narrow gap an I-beam shaped support structure such that:
the first burling region extends into a first side of the I-beam shaped support structure; and the second burling region extends into a second side of the I-beam shaped support structure, opposite the first side and the first burling region.

20. The glass tube of claim 19, wherein the glass tube is configured to have the I-beam shaped support structure disposed within the narrow gap such that the I-beam shaped support structure and the glass tube are coaxial.

21. A tubular semiconductor lamp comprising the glass tube of claim 1.

22. A tubular semiconductor lamp comprising the glass tube of claim 17.

* * * * *